United States Patent
Tsai et al.

(10) Patent No.: US 9,348,211 B2
(45) Date of Patent: May 24, 2016

(54) CAMERA MODULE AND PORTABLE DEVICE USING THE SAME

(75) Inventors: Meng-Han Tsai, Taoyuan County (TW); Chun-Ta Lin, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 1073 days.

(21) Appl. No.: 13/423,710

(22) Filed: Mar. 19, 2012

(65) Prior Publication Data

US 2013/0242061 A1 Sep. 19, 2013

(51) Int. Cl.
*G03B 35/10* (2006.01)
*H04N 13/02* (2006.01)

(52) U.S. Cl.
CPC .............. *G03B 35/10* (2013.01); *H04N 13/021* (2013.01)

(58) Field of Classification Search
CPC ............................. G03B 35/10; H04N 13/021
See application file for complete search history.

(56) References Cited

U.S. PATENT DOCUMENTS

| | | | |
|---|---|---|---|
| 2001/0004298 A1* | 6/2001 | Kobayashi | 359/462 |
| 2001/0015847 A1* | 8/2001 | Sugawara | 359/462 |
| 2003/0067538 A1* | 4/2003 | Myers | G01B 11/2509 348/47 |
| 2003/0174237 A1* | 9/2003 | Lee | 348/363 |
| 2005/0175334 A1* | 8/2005 | Lee | 396/327 |
| 2011/0069156 A1 | 3/2011 | Kurahashi | |
| 2011/0298917 A1 | 12/2011 | Yanagita | |

FOREIGN PATENT DOCUMENTS

| | | |
|---|---|---|
| CN | 2539203 Y | 3/2003 |
| CN | 1474230 A | 2/2004 |
| CN | 201184953 Y | 1/2009 |
| CN | 102282857 A | 12/2011 |
| CN | 102375321 A | 3/2012 |
| JP | 2010-56865 A | 3/2010 |
| JP | 2011-48120 A | 3/2011 |

* cited by examiner

*Primary Examiner* — Sath V Perungavoor
*Assistant Examiner* — Peter D Le
(74) *Attorney, Agent, or Firm* — Birch, Stewart, Kolasch & Birch, LLP

(57) ABSTRACT

An embodiment of the invention provides a 3D camera module. The 3D camera module comprise a first lens, a second lens, a shutter control device, a first mirror, a second mirror and an image sensor. The first lens receives a first light beam. The second lens receives a second light beam. The shutter control device to control the first lens and the second camera and only one of the first shutter and the second shutter is turned on in one time period. The first mirror reflects the first light beam to the image sensor. The second mirror reflects the second light beam to the image sensor. The image sensor receives the first light beam and the second light beam to capture a first image and a second image and a 3D image is generated according to the first image and the second image.

9 Claims, 4 Drawing Sheets

CAMERA MODULE AND PORTABLE DEVICE USING THE SAME

BACKGROUND OF THE INVENTION

1. Field of the Invention

The present invention relates to a camera module and more particularly to camera with two lenses and one sensor.

2. Description of the Related Art

In mobile phone camera applications, manufacturers are continuing in pursuing higher and higher resolution solutions. In the same time, camera solutions also develop in a very different way—the 3D camera. Different from high resolution solutions, 3D camera brings a whole new image viewing experience by making users feel the scenes are in three-dimensional in their eyes. The conventional 3D camera module normally requires two camera modules to deliver individual images corresponding to a user's left and right eyes. The design is usually more complex and more expensive.

As mentioned, in a 3D camera system, designers normally need two camera modules. In other words, there are two image sensors in the whole system. Such arrangement creates some potential problems. First, each sensor also has different shading characteristics, which means we need to apply shading calibration. Second, each sensor has more or less performance difference in color even if exposed to the same light source. Thus, WB (white balance) calibration is always necessary. The need in shading and WB calibration makes system design more complicated. Finally, two sensors implies double cost. The whole 3D camera module is thus at least two times more expensive than ordinary camera modules.

BRIEF SUMMARY OF THE INVENTION

An embodiment of the invention provides a 3D camera module. The 3D camera module comprises a first lens, a second lens, a shutter control device, a first mirror, a second mirror and only one image sensor. The first lens receives a first light beam. The second lens receives a second light beam. The shutter control device to control the first lens and the second camera and only one of the first shutter and the second shutter is turned on in one time period. The first mirror reflects the first light beam to the image sensor. The second mirror reflects the second light beam to the image sensor. The image sensor receives the first light beam and the second light beam to capture a first image and a second image and a 3D image is generated according to the first image and the second image.

Another embodiment of the invention provides a portable device comprising a 3D camera module and a processor. The 3D camera module comprises a first lens to receive a first light beam, a second lens to receive a second light beam and an image sensor to receive the first light beam or the second light beam to capture a first image and a second image. The processor controls the 3D camera module to ensure the image sensor to receive only one of the first light beam and the second light beam, and processes the first image and the second image to generate a 3D image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
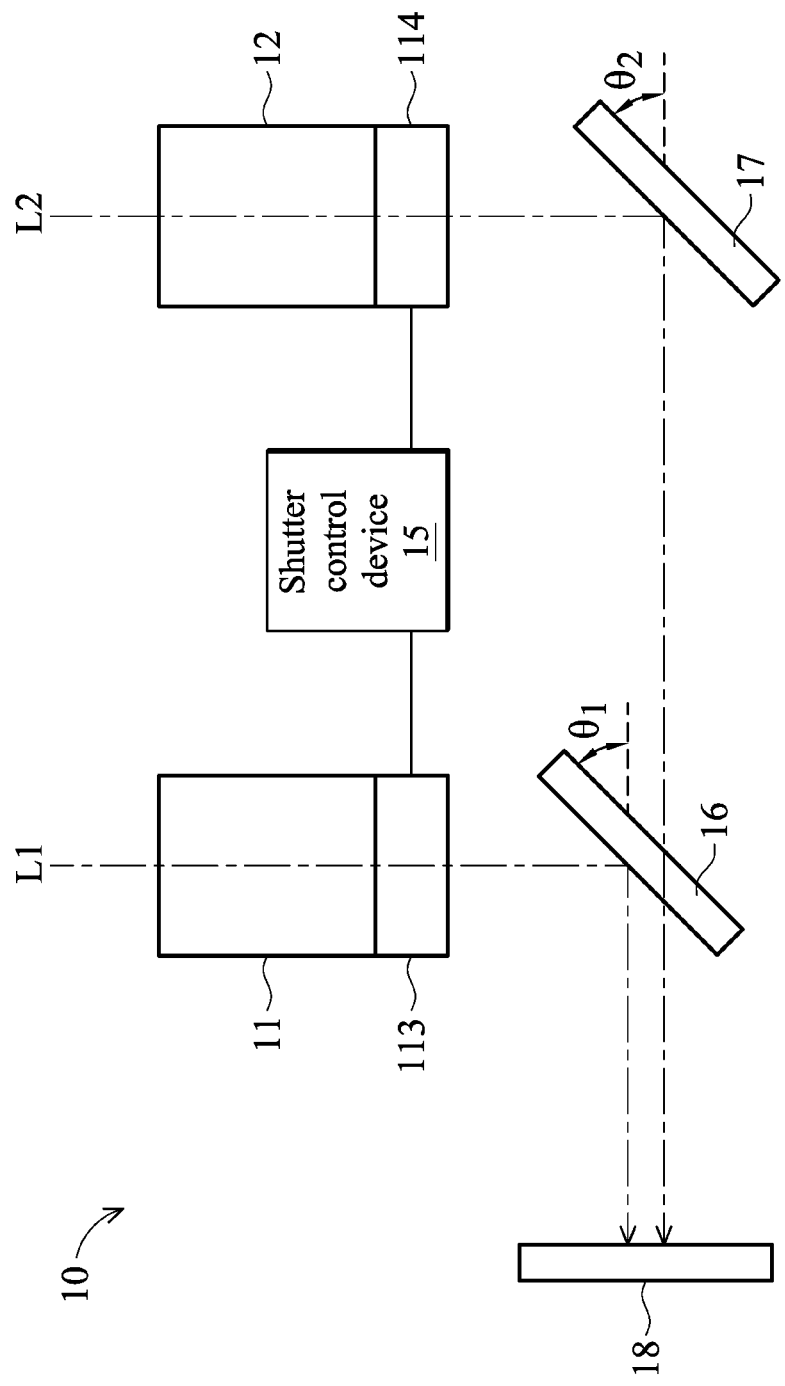
FIG. 1 is a schematic diagram of a 3D camera module according to an embodiment of the invention.

FIG. 1 is a schematic diagram of a 3D camera module according to an embodiment of the invention. The 3D camera module 10 comprises a first lens 11, a second lens 12, a shutter control device 15, a first shutter 113, second shutter 114, a first mirror 16, a second mirror 17 and an image sensor 18. The shutter control device 15 controls the first shutter 113 and second shutter 114, and only one of the first shutter 113 and the second shutter 114 is turned on at one time. The first shutter 113 and second shutter 114 may be a mechanical shutter or an electrical shutter.

When the first shutter 113 is turned on, the first light beam L1 is passed and the first mirror 16 reflects the first light beam L1 to the image sensor 18. The image sensor 18 captures and transmits a first image to an image processor. When the second shutter 114 is turned on, the second light beam L2 is passed and the second mirror 17 reflects the second light beam L2 to the image sensor 18. Before the second light beam L2 reaches to the image sensor 18, the second light beam L2 will pass through the second mirror 17. In other words, the second mirror 17 can reflect lights and allows lights passing through.

The image sensor 18 captures and transmits a second image to the image processor. The image processor then generates a 3D image according to the first image and the second image. In other embodiments, the image sensor 18 continuously transmits images to the image processor and the image processor generates a 3D motion image or a 3D film according to the images.

Assuming a frame per second value of the image sensor 18 is X, a shutter speed of the first shutter 113 or the second shutter 114 must be equal to or smaller than X/2 second, and the shutter control device 15 adjusts the open time or a turn-on duration of the first shutter 113 or the second shutter 114 accordingly.

In FIG. 1, the first mirror 16 tilts to an angle $\theta_1$ and the second mirror 17 tilts to an angle $\theta_2$. The angle $\theta_1$ is different from the angle $\theta_2$. An angle adjustment device can be applied to adjust the angles $\theta_1$ and $\theta_2$ to ensure that a projecting area of the first light beam L1 is approximately the same as a projecting area of the second light beam L2.

Figure 2:
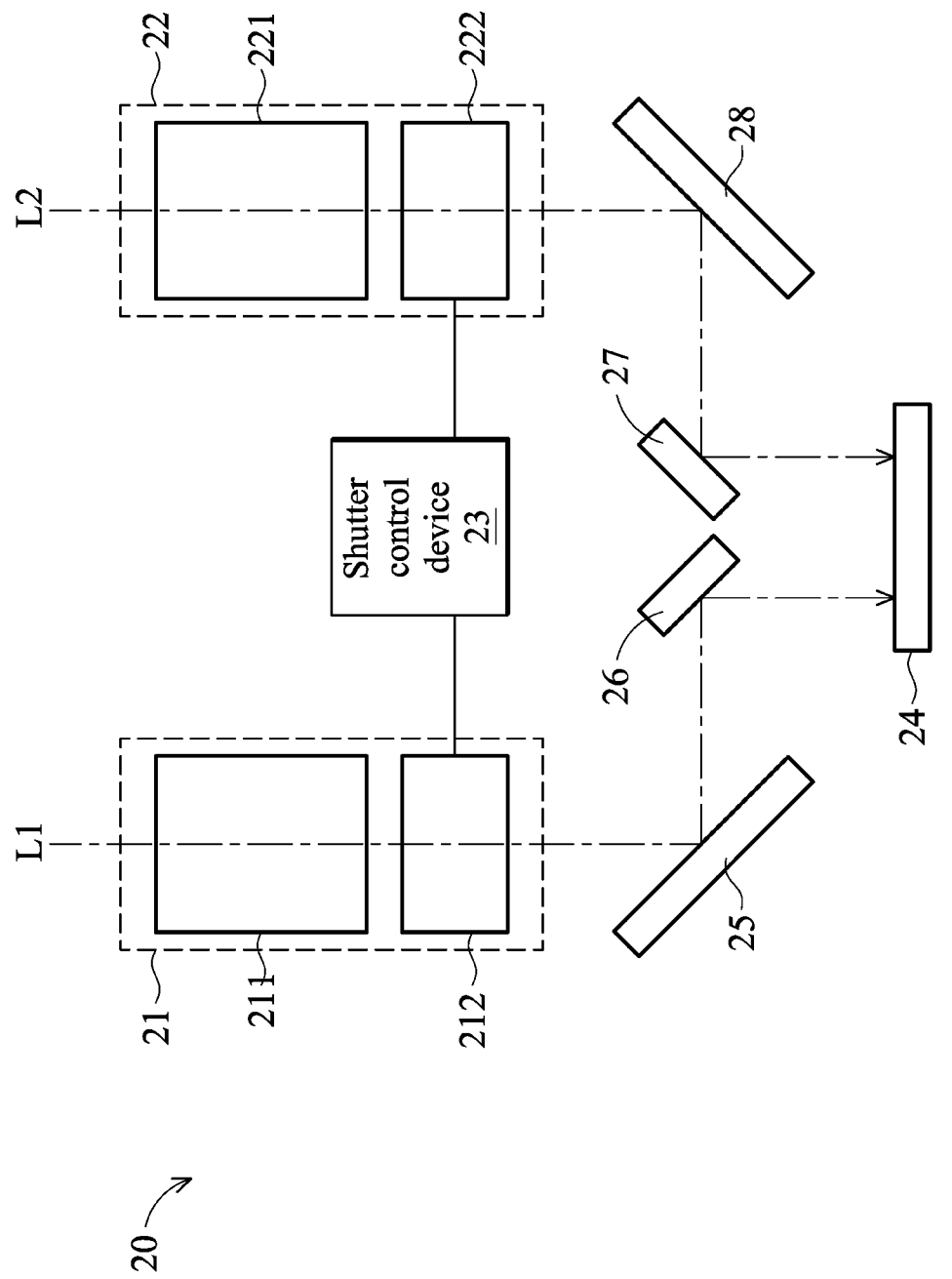
FIG. 2 is a schematic diagram of a 3D camera module according to another embodiment of the invention.

FIG. 2 is a schematic diagram of a 3D camera module according to another embodiment of the invention. The 3D camera module 20 comprises a first lens 21, a second lens 22, a shutter control device 23, a first mirror 25, a second mirror 26, a third mirror 27, a fourth mirror 28 and an image sensor 24. The first lens 21 comprises a first aperture 211 and a first shutter 212. The second lens 22 comprises a second aperture 221 and a second shutter 222. The shutter control device 23 controls the first shutter 212 and second shutter 222, and only one of the first shutter 212 and the second shutter 222 is turned on at one time. The first shutter 212 and second shutter 222 may be a mechanical shutter or an electrical shutter.

When the first shutter 212 is turned on, the first light beam L1 is passed and the first mirror 25 and the second mirror 26 reflect the first light beam L1 to the image sensor 24. The image sensor 24 then captures and transmits a first image to an image processor. When the second shutter 222 is turned on, the second light beam L2 is passed and the third mirror 28 and the fourth mirror 27 reflect the second light beam L2 to the image sensor 24. The image sensor 24 captures and transmits a second image to the image processor. The image processor then generates a 3D image according to the first image and the second image. In other embodiments, the image sensor 24 continuously transmits images to the image processor and the image processor generates a 3D motion image or a 3D film according to the images.

Assuming a maximum frame per second value of the image sensor 24 is X, a shutter speed of the first shutter 212 or the second shutter 222 must be equal to or smaller than X/2 second, and the shutter control device 23 adjusts the open time or a turn-on duration of the first shutter 212 or the second shutter 222 accordingly.

Figure 3:
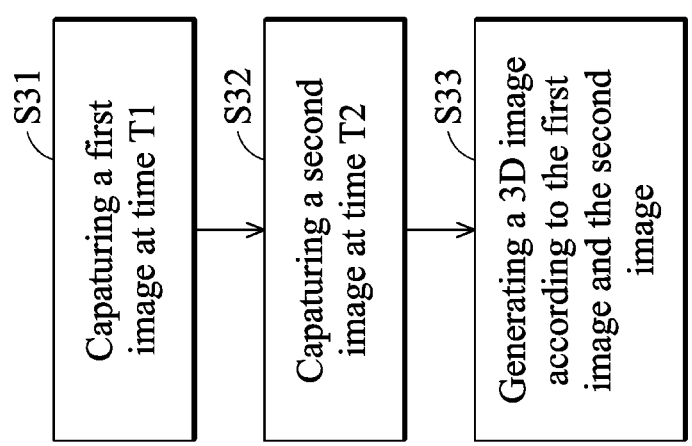
FIG. 3 is a flowchart of an embodiment of a method for generating a 3D image by the proposed 3D camera module.

FIG. 3 is a flowchart of an embodiment of a method for generating a 3D image by the proposed 3D camera module. In step S31, a first shutter is turned on, a second shutter is turned off, and an image sensor captures a first image via a first lens of the 3D camera module. In step S32, a first shutter is turned off, a second shutter is turned on, and the image sensor captures a second image via a second lens of the 3D camera module. The first shutter and the second shutter are controlled by a shutter control device or a processor, and only one shutter is turned on in one time period. In this embodiment, the shutter is turned on means the shutter is opened and then closed quickly. When the shutter is opened, a light beam is allowed to pass through the shutter and the image sensor can capture an image corresponding to the light beam. In step S33, an image processor generates a 3D image according to the first image and the second image.

Figure 4:
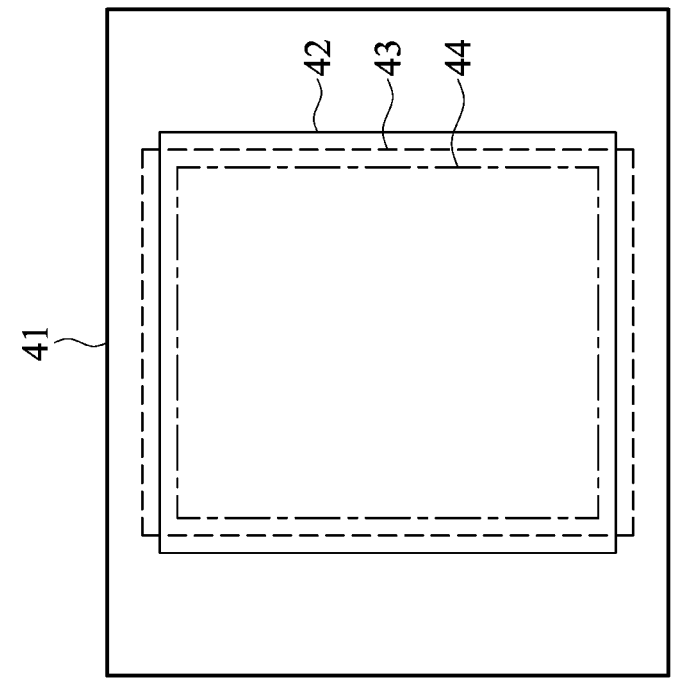
FIG. 4 is a schematic diagram showing an image calibration method according to the invention.

In FIG. 1, the first mirror 16 reflects the first light beam to the image sensor 18 to form a first projecting area and the second mirror 17 reflects the second light beam to the image sensor 18 to form a second projecting area. However, the first projecting area and the second projecting area may have some difference. Please refer to FIG. 4. FIG. 4 is a schematic diagram showing an image calibration method according to the invention. Assuming a first frame 42 on an image sensor 41 is the first projecting area formed by the first light beam and a second frame 43 is the second projecting area formed by the second light beam. It is obvious that the shapes of the first frame 42 and the second frame 43 are different, and is may cause error or affect the performance for the generation of 3D image. To reduce the adverse impacts, the invention provides a method to solve the issue. The capture window 44 is applied to capture central part of the images sensed by the image sensor 41. Since the deformation in the area around the first frame 42 and the second frame 43 is more serious than the central part thereof, the images captured by the capture window 44 can decrease the deformation. Noted that the capture window 44 is a function description, not to limit the capture window 44 to be hardware elements. An image processor receives images from the sensor 41 can use software to achieve the same purpose.

Figure 5:
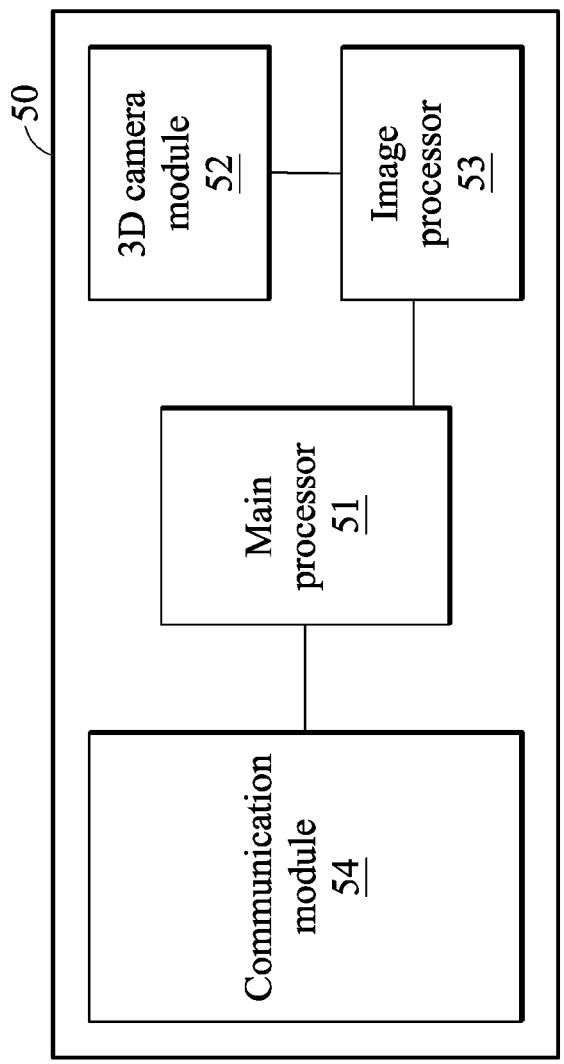
FIG. 5 is a schematic diagram of an embodiment of a portable device with a 3D camera module according to the invention.

FIG. 5 is a schematic diagram of an embodiment of a portable device with a 3D camera module according to the invention. The portable device 50 comprises a main processor 51, a 3D camera module 52, an image processor 53 and a communication module 54. The 3D camera module 52 comprises two lens and only one image sensor. The detail of the 3D camera module 52 can be referred to FIG. 1 and FIG. 2. The image processor 53 receives images captured by the 3D camera module 52 and generates a 3D image according to received images. The main processor 51 may show the 3D image on a display device of the portable device or share the 3D image with others via the communication module 54.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D camera module, comprising:
   a first lens to receive a first light beam;
   a second lens to receive a second light beam;
   a first shutter corresponding to the first lens;
   a second shutter corresponding to the second lens;
   a shutter control device to control the first lens and the second lens and only one of the first shutter and the second shutter is turned on in one time period;
   a first mirror to reflect the first light beam to an image sensor after the first light beam passes through the first shutter, so that a reflected first light beam is directly passed to an image sensor from the first mirror;
   a second mirror to reflect the second light beam to the image sensor after the second light beam passes through the second shutter, so that a reflected second light beam is passed to the image sensor by passing through the first mirror; and
   the image sensor receiving the first light beam and the second light beam reflected by the first mirror and the second mirror, respectively, to capture a first image and a second image so that a 3D image is generated according to the first image and the second image,
   wherein the reflected second light beam from a center of the second mirror is parallel with and spaced apart from the reflected first light beam from a center of the first mirror, and passes through the first mirror before arriving at the image sensor.

2. The module as claimed in claim 1, wherein the first lens comprises:
   a first aperture to receive the first light beam corresponding to a first image,
   wherein the first shutter is controlled by a first control signal to allow the first light beam pass when the first shutter is turn on.

3. The module as claimed in claim 1, wherein the second lens comprises:
   a second aperture to receive the second light beam corresponding to a second image,
   wherein the second shutter is controlled by a second control signal to allow the second light beam pass when the second shutter is turn on.

4. The module as claimed in claim 1, wherein a frame per second value of the image sensor is X and a shutter speed of the first shutter or the second shutter is equal to or smaller than X/2 second.

5. A portable device, comprising:
   a 3D camera module, comprising:
   a first lens to receive a first light beam;

a second lens to receive a second light beam;
a first shutter corresponding to the first lens;
a second shutter corresponding to the second lens;
a first mirror to reflect the first light beam to an image sensor after the first light beam passes through the first shutter, so that a reflected first light beam is directly passed to an image sensor from the first mirror;
a second mirror to reflect the second light beam to the image sensor after the second light beam passes through the second shutter, so that a reflected second light beam is passed to the image sensor by passing through the first mirror; and
the image sensor to receive the first light beam and the second light beam reflected by the first mirror and the second mirror, respectively, to capture a first image and a second image; and
a processor to control the 3D camera module to ensure the image sensor to receive only one of the first light beam and the second light beam in one time period, and process the first image and the second image to generate a 3D image,
wherein the reflected second light beam from a center of the second mirror is parallel with and spaced apart from the reflected first light beam from a center of the first mirror, and passes through the first mirror before arriving at the image sensor.

6. The device as claimed in claim 5, wherein the 3D camera module further comprises a shutter control device, controlled by the processor, to block the first light beam or the second light beam in one time period.

7. The device as claimed in claim 5, wherein the first lens comprises:
a first aperture to receive the first light beam corresponding to a first image,
wherein the first shutter is controlled by a first control signal to allow the first light beam pass when the first shutter is turn on.

8. The device as claimed in claim 5, wherein the second lens comprises:
a second aperture to receive the second light beam corresponding to a second image,
wherein the second shutter is controlled by a second control signal to allow the second light beam pass when the second shutter is turn on.

9. The device as claimed in claim 5, wherein a frame per second value of the image sensor is X and a shutter speed of the first shutter or the second shutter is equal to or smaller than X/2 second.

* * * * *